US006157417A

United States Patent [19]
Cho

[11] Patent Number: 6,157,417
[45] **Date of Patent: *Dec. 5, 2000**

[54] POWER CONTROL APPARATUS WITHIN A DISPLAY DEVICE

[75] Inventor: Chun-Jung Cho, Taoyuan, Taiwan

[73] Assignee: Acer Peripherals Inc., Taiwan

[ * ] Notice: This patent issued on a continued prosecution application filed under 37 CFR 1.53(d), and is subject to the twenty year patent term provisions of 35 U.S.C. 154(a)(2).

[21] Appl. No.: 08/932,943

[22] Filed: Sep. 17, 1997

[30] Foreign Application Priority Data

Jun. 12, 1997 [TW] Taiwan ................................ 86209601

[51] Int. Cl.[7] ........................................ H04N 5/64

[52] U.S. Cl. .......................... 348/836; 348/787; 348/789; 312/7.2

[58] Field of Search .................................... 348/836, 843, 348/825, 787, 789, 805, 372–373; 312/7.2; 361/681–683, 752, 600; 313/2.1, 364–365; 200/308, 314; H04N 5/64, 5/645, 5/655

[56] References Cited

U.S. PATENT DOCUMENTS

| | | | |
|---|---|---|---|
| 4,716,493 | 12/1987 | Zelkowitz | 312/7.2 |
| 5,122,928 | 6/1992 | Lo | 361/752 |
| 5,321,516 | 6/1994 | Chen | 348/825 |
| 5,347,427 | 9/1994 | Kinoshita | 361/752 |
| 5,577,601 | 11/1996 | Chung et al. | 200/331 |
| 5,691,781 | 11/1997 | Siccardo | 348/827 |
| 5,742,359 | 4/1998 | Han | 348/836 |
| 5,863,106 | 1/1999 | Beak | 348/836 |
| 5,900,920 | 5/1999 | Lee et al. | 348/836 |

FOREIGN PATENT DOCUMENTS

| | | | |
|---|---|---|---|
| 0566906A2 | 10/1993 | Japan | H04N 5/655 |

*Primary Examiner*—Vu Le

[57] ABSTRACT

The power control apparatus in a display device including a button, a link bar and a power switch is provided. The monitor includes a bracket, a circuit board and a panel. The bracket includes a guiding slot. The button, which includes a first end and a second end, is located on the panel. The first end is provided to be accessed by a user. The link bar has a first end and a second end. The first end of the link bar contacts with the second end of the button such that the link bar moves responsive to movement of the button. The power switch, responsive to movement of the second end of the link bar, selectively applies a power supply to the circuit board. The link bar includes an engagement portion for engaging with and sliding longitudinally along the bracket. The link bar of the invention is easily installed and disjoined and does not occupy the space on the print circuit board.

6 Claims, 4 Drawing Sheets

POWER CONTROL APPARATUS WITHIN A DISPLAY DEVICE

FIELD OF INVENTION

This invention relates to power control mechanism within a display device, i.e. a monitor.

BACKGROUND OF INVENTION

As well known in the arts, a power button located on the panel (bezel) of a display device is provided for turning on the power supply to the display device. In general, the power button is located on the front or side location of the panel. The power button has a first end, which is provided to be accessed by a user, and second end. A user may push the power button to switch the power supply to the circuit board and other elements in the monitor, and vice versa.

Typically, most display devices are designed in such way that the power supply socket is located on the rear location of the display device. The power supply socket functions to connects with a power cable. A power switch is located, in general, within and on the rear side of the display device, and functions to apply the power supply, when activated by the button on the front panel via a link bar, to circuit and other elements in the display device. The link bar includes a first and second ends. The first end of the link bar contacts with the second end of the button and, therefore, the link bar moves, responsive to movement of the button. The power switch, responsive to movement of the second end of the link bar, selectively applies the power supply to circuit and other elements in the display device. Conventionally, the link bar is located on and slides upon the print circuit board within the display device. This conventional design renders a smaller space on the print circuit board which is available for circuit layout purpose.

To overcome the drawback of the conventional design, the object of the invention is to provide a link bar which does not occupy the space on the print circuit board.

SUMMARY OF THE INVENTION

The power control apparatus in a display device including a button, a link bar and a power switch is provided. The monitor includes a bracket, a circuit board and a panel. The bracket includes a guiding slot. The button, which includes a first end and a second end, is located on the panel. The first end is provided to be accessed by a user. The link bar has a first end and a second end. The first end of the link bar contacts with the second end of the button such that the link bar moves responsive to movement of the button. The power switch, responsive to movement of the second end of the link bar, selectively applies a power supply to the circuit board.

The link bar includes an engagement portion for engaging with and sliding longitudinally along the bracket.

BRIEF DESCRIPTIONS OF THE APPENDED DRAWINGS

DETAILED DESCRIPTIONS OF THE PREFERRED EMBODIMENT

Figure 1:
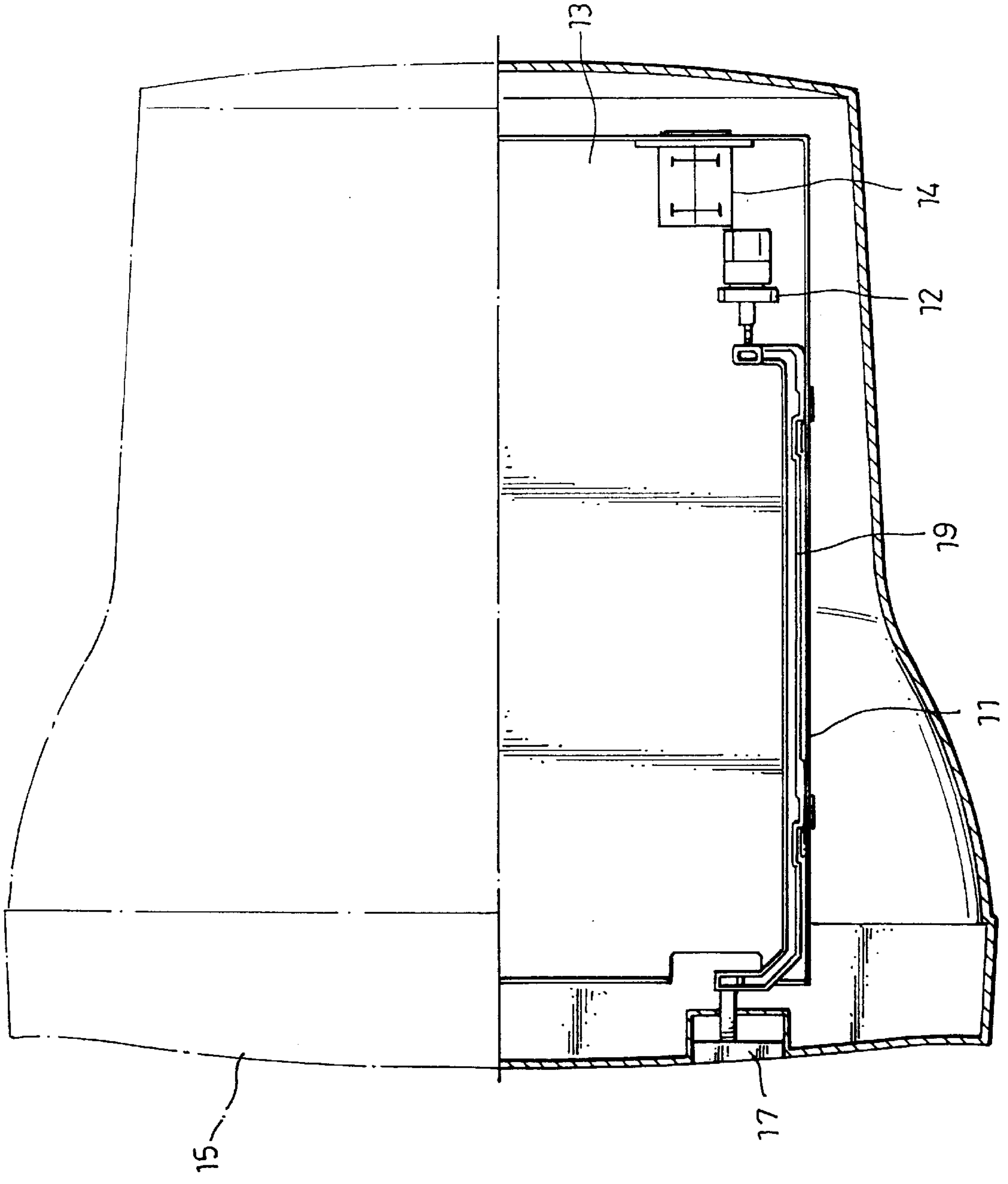
FIG. 1 shows associated elements of the power control apparatus within a display device in top planar view.
Figure 2:
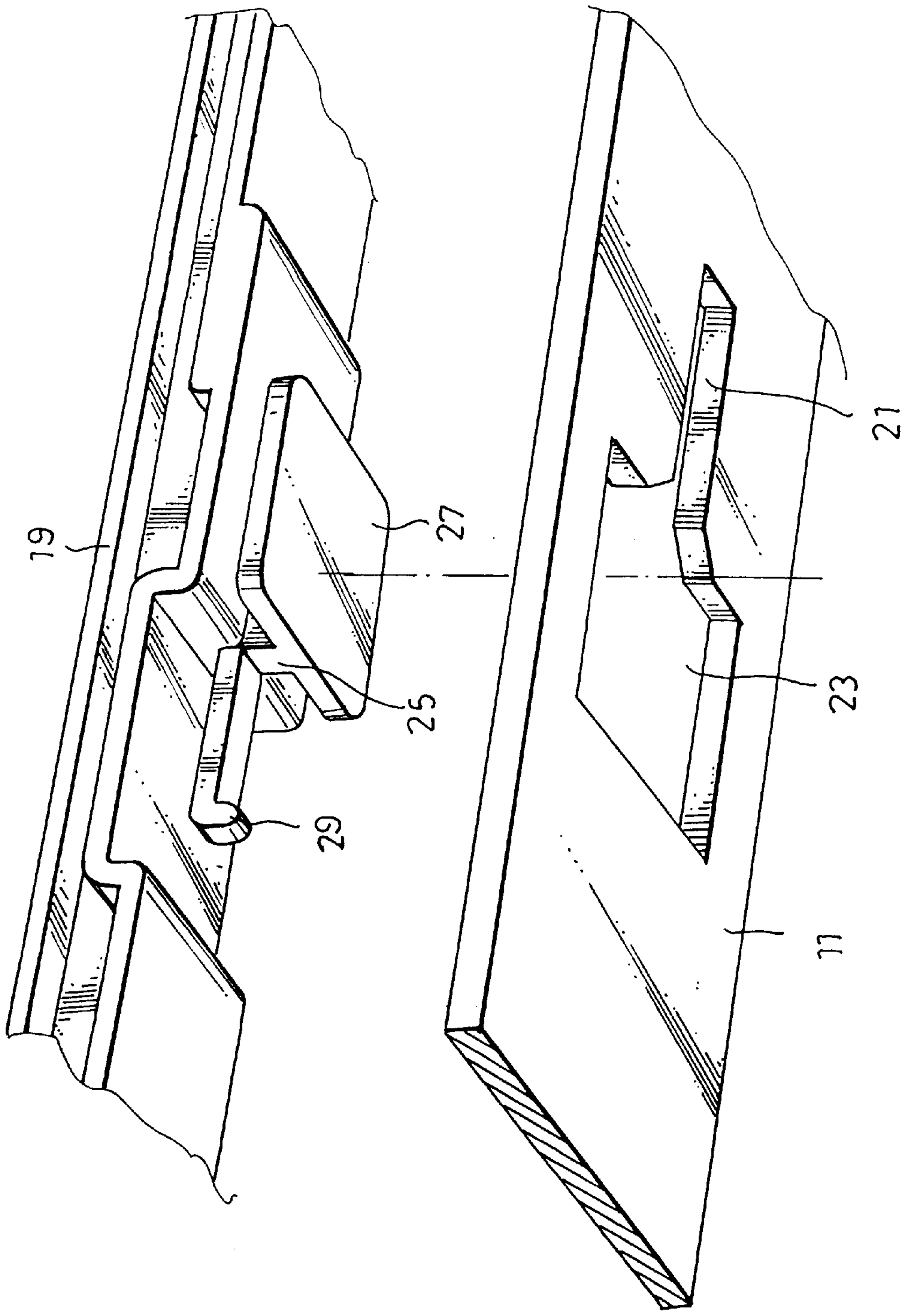
FIG. 2 shows in perspective view the link bar and the bracket before assembly.

As shown in FIG. 1, the display device implementing the present invention includes a bracket 11, a print circuit board 13 and a front panel 15. The bracket 11 is vertically disposed with respect to the print circuit board 13. As shown in FIG. 2, the bracket 11 has a guiding slot which has a first guide slot 21 and a second guide slot 23. The width of the second guide slot 23 is larger than that of the first guide slot 21. In general, the bracket 11 is made of metal material and functions to shield the electric-magnetic wave generated inside the display device.

The power control apparatus of the invention includes a button 17, a link bar 19 and a power switch 12. The button 17 is located on the panel 15 of the monitor. The button 17 includes a first end and a second end. The first end is provided to be accessed by a user.

The link bar 19 has a first end and a second end. The first end of the link bar 19 contacts with the second end of the button 17 such that the link bar 19 moves responsive to movement of the button 17.

As known in the prior arts, the power socket 14 functions to connect to a connector of a power cable (not shown). The power switch 12 contacts with the second end of the link bar 19 and, responsive to movement of the second end of the link bar 19, selectively applies a power supply, via the power cable and power socket, to the print circuit board 13.

As shown in FIG. 2, the link bar 19 includes an engagement portion which includes a guide rail 25, an extended flange 27 and a cantilever rib 29. The flange 27, which presents a third width dimension, extends vertically in respect to the guide rail 25 as shown. The third width dimension of the flange 27 is smaller than the second width dimension of the second guide slot 23, and larger than the first width dimension of the first guide slot 21, for preventing lateral disengagement of the link bar 19 from the bracket 11. The guide rail 25 is placed into and slides along the first guide slot 21. The cantilever rib 29 limits the relative longitudinal movement between the link bar 19 and the bracket 11.

Figure 3:
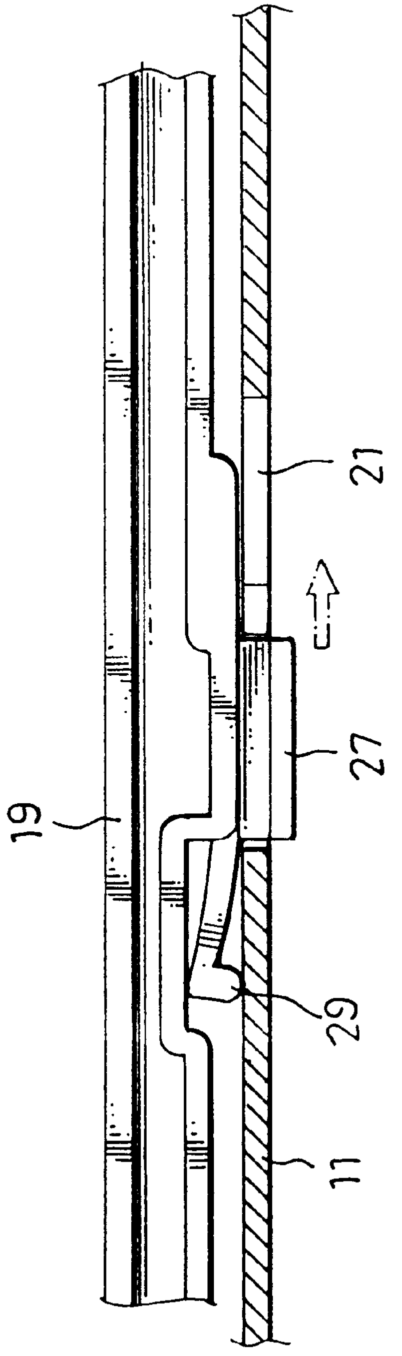
FIG. 3 shows in section view the link bar and the bracket on the outset of assembly.
Figure 4:
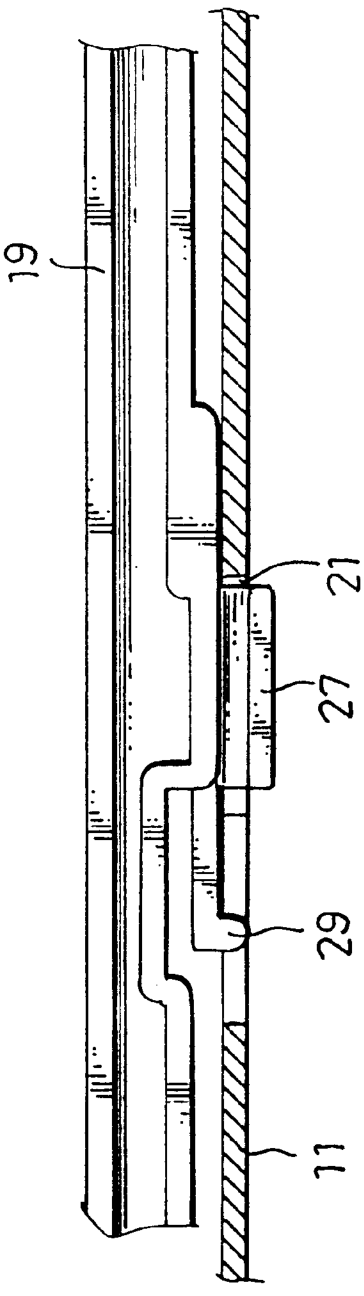
FIG. 4 shows in section view the link bar and the bracket after assembly.

As shown in FIG. 3, before assembling the engagement portion of link bar 19 and the bracket 11, each is aligned to the other. Afterwards, in lateral direction, dispose the flange 27 into the second guide slot 23 in which the cantilever rib 29 pushes against the surface of the bracket 11. Thereafter, force the link bar 19 to move longitudinally a distance by which the guide rail 25 is disposed into and slides along the first guide slot 21. As movement of the guide rail 25 past one location, the cantilever rib 29 does not touch against the surface of the bracket 11 and is totally disposed into the space of the second guide slot 23, as shown in FIG. 4. The arrangement of the cantilever rib 29 indirectly prevents the disengagement of the link bar 19 from the bracket 11 during transportation of the monitor in production line.

After assembly as shown in FIG. 1, responsive to the action of the user to the button 17, the link bar 19 moves and changes the status of the power switch 12. Therefore, the power supply may be either applied to or disconnected from the print circuit board 13.

Figure 5:
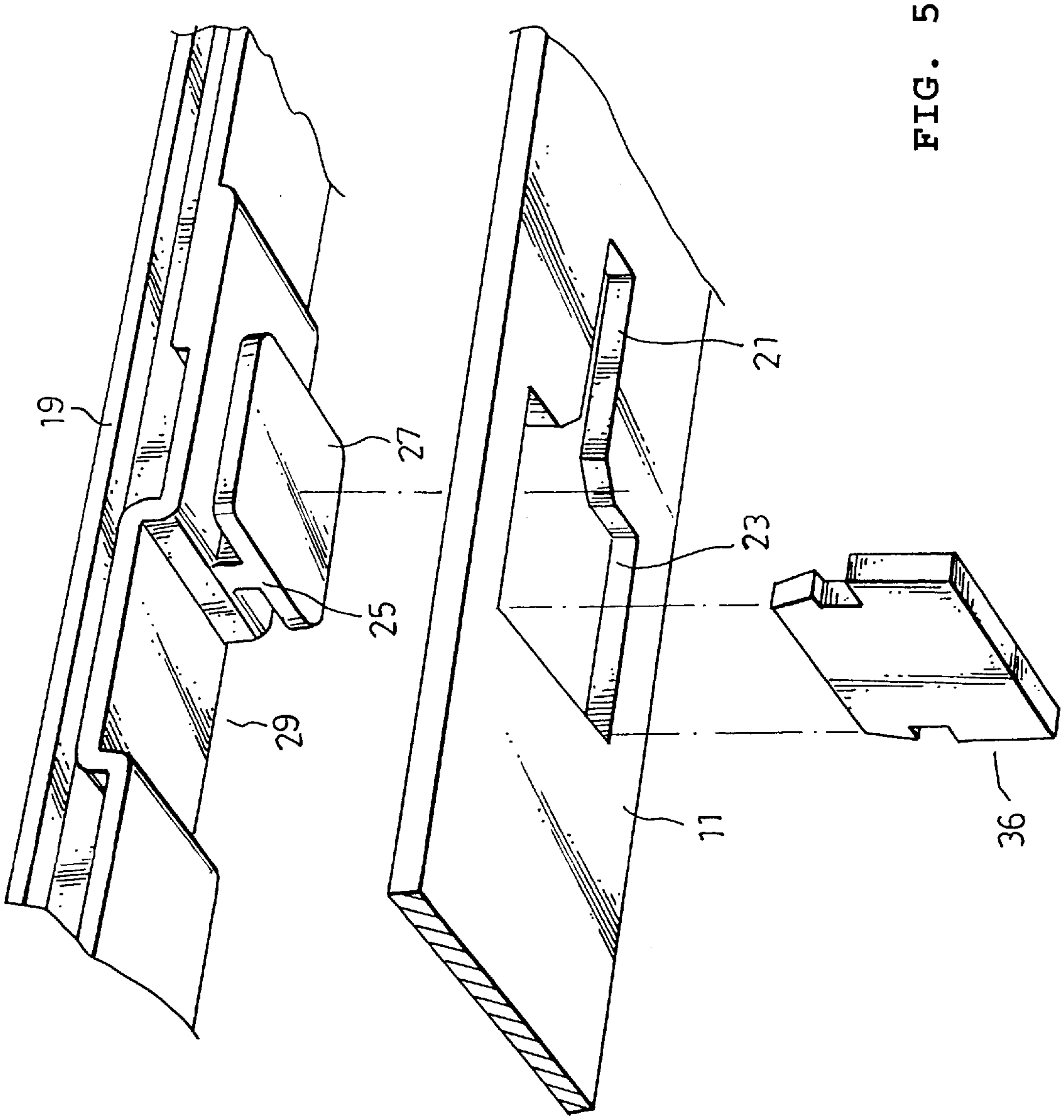
FIG. 5 shows the second embodiment of the invention in explosive view.

In the second embodiment, the link bar 19 does not include the cantilever rib as recited for the first embodiment. In a second embodiment shown in FIG. 5, a deformable retainer 36 is provided to perform the function of the cantilever rib 29 of the first embodiment described above. After assembly of the link bar 19 with the bracket 11 according to procedure recited above, a deformable retainer 36 is further disposed into the second guide slot 23 for limiting the relative longitudinal movement between the link bar 19 and the bracket 11. The arrangement of the deformable retainer 36 indirectly prevents the disengagement of the link bar 19 from the bracket 11 during transportation of the monitor in production line.

I claim:

1. A power control apparatus in a display device, the display device including a bracket, a circuit board and a panel, the bracket including a guiding slot which has a first guide slot of a first width dimension, and a second guide slot of a second width dimension larger than the first width dimension, the power control apparatus comprising:

a button located on the panel, the button including a first end and a second end, the first end being provided to be accessed by a user;

a link bar having a first end and a second end, the first end of the link bar contacting with the second end of the button such that the link bar moves responsive to movement of the button; and a power switch, responsive to movement of the second end of the link bar, for selectively applying a power supply to the circuit board, wherein the link bar includes an engagement portion, the engagement portion includes a guide rail together with a flange of a third width dimension, which is smaller than the second width of the second guide slot and larger than the first width of the first guide slot, the guide rail is placed into and slides along the first guide slot, for preventing lateral disengagement of the link bar from the bracket, and the engagement portion includes a cantilever rib extending from a root portion of the guide rail and along movement direction of the link bar for limiting the relative longitudinal movement between the link and the bracket.

2. The apparatus of claim 1, wherein, after assembly of the link bar with the bracket, a retainer is further placed into the second guide slot for limiting the relative longitudinal movement between the link bar and the bracket.

3. A power control apparatus in a display device, the display device including a bracket, a circuit board and a panel, the bracket including a guiding slot, the power control apparatus comprising:

a button located on the panel, the button including a first end and a second end, the first end being provided to be accessed by a user;

a link bar having a first end and a second end, the first end of the link bar contacting with the second end of the button such that the link bar moves responsive to movement of the button; and a power switch, responsive to movement of the second end of the link bar, for selectively applying a power supply to the circuit board, wherein the link bar includes an engagement portion for engaging with and sliding longitudinally along the bracket, the guiding slot has a first guide slot with a first width dimension and a second guide slot with a second width dimension larger than the first width dimension, the engagement portion includes a guide rail together with a flange of a third width dimension, and a cantilever rib extending from a root portion of the guide rail and along movement of the link bar, the guide rail is placed into and slides along the first guide slot for preventing lateral disengagement of the link bar from the bracket, third width dimension of the flange is smaller than the second width dimension of the second guide slot and larger than the first width dimension of the first guide slot, and the cantilever rib limits the relative longitudinal movement between the link bar and the bracket.

4. A power control apparatus in a display device, the display device including a circuit board and a panel, the power control apparatus comprising:

a button located on the panel, the button including a first end and a second end, the first end being provided to be accessed by a user to generate a movement of the button;

a link bar having a first end and a second end, the first end of the link bar contacting with the second end of the button whereby the link bar moves responsive to the movement of the button;

a power switch contacted with the second end of the link bar whereby the power switch selectively switched on-off responsive to the movement of the second end of the link bar;

a bracket having a guiding slot, the bracket is vertically disposed with respect to a main surface of the print circuit board and along a periphery of the print circuit board to avoid occupying the main surface of the print circuit board;

a guiding rail formed on the link bar, said guiding rail is placed into and sliding along the guiding slot, and wherein, the link bar includes a cantilever rib extending from a root portion of the guide rail and along movement direction of the link bar for limiting the relative longitudinal movement between the link bar and the bracket.

5. The apparatus of claim 5, wherein the guiding slot has a first guide slot of a first width dimension, and a second guide slot of a second width dimension larger than the first width dimension, wherein a flange of a third width dimension is formed on the top of the guiding rail, the third width dimension is smaller than the second width of the second guide slot and larger than the first width of the first guide slot, for preventing lateral disengagement of the link bar from the bracket.

6. The apparatus of claim 6, wherein, after assembly of the link bar with the bracket, a retainer is further placed into the second guide slot for limiting the relative longitudinal movement between the link bar and the bracket.

* * * * *